United States Patent [19]
Steeb

[11] Patent Number: 4,505,419
[45] Date of Patent: Mar. 19, 1985

[54] METHOD FOR THE MANUFACTURE OF A HEAT-EXCHANGER HAVING AT LEAST ONE CURVED TUBE OF FLAT CROSS-SECTION

[76] Inventor: Dieter Steeb, Im Schonenbuhl, CH-9050 Steinegg-Appenzell, Fed. Rep. of Germany

[21] Appl. No.: 331,770

[22] Filed: Dec. 17, 1981

[30] Foreign Application Priority Data

Dec. 24, 1980 [DE] Fed. Rep. of Germany ....... 3049168

[51] Int. Cl.$^3$ .............................................. B23P 15/26
[52] U.S. Cl. ................................ 228/183; 29/157.3 R; 29/157.3 C
[58] Field of Search ................................ 228/183, 184; 29/157.3 R, 157.3 A, 157.4, 157.3 C

[56] References Cited

U.S. PATENT DOCUMENTS 1,804,624  5/1931  King ................................ 228/183 X
3,479,731  11/1969  Mantel et al. ................... 29/157.3 D
4,228,847  10/1980  Lindahl ........................... 29/157.3 R Primary Examiner—Howard N. Goldberg
Assistant Examiner—V. K. Rising
Attorney, Agent, or Firm—Hopgood, Calimafde, Kalil, Blaustein & Judlowe

[57] ABSTRACT

A method for manufacturing a heat exchanger using a non-eutectic solder which melts over a melting range is disclosed. The soldering is carried out in two successive soldering steps, first at a soldering temperature which is at the lower end of the melting range, and then at a higher soldering temperature within the same range. Flat plates and straight-edge strips are used for the first soldering step. The straight tube of flat cross section produced in this manner is then curved in the desired fashion and soldered in final manner by the second soldering step.

5 Claims, 2 Drawing Figures

METHOD FOR THE MANUFACTURE OF A HEAT-EXCHANGER HAVING AT LEAST ONE CURVED TUBE OF FLAT CROSS-SECTION

BACKGROUND OF THE INVENTION

The present invention relates to a method of manufacturing a heat exchanger having at least one longitudinally curved tube of flat cross-section which tube consists of two curved plates held spaced apart from each other by two curved edge strips all of which are held together by solder, the soldering together of the plates and strips being effected by a solder with which at least one of the mating surfaces between said plates and strips has been clad.

The object of the invention is to provide a method by which heat exchangers, having at least one curved tube of flat cross-section, can be manufactured in as simple convenient and economical manner as possible.

This object is achieved in accordance with the present invention by the use of a special solder having a predetermined range over which melting occurs. Accordingly, a straight tube of flat cross-section is first assembled from flat plates and flat edge strips by preliminary soldering together the component parts in a first soldering process using a first soldering temperature which lies in the lower part of the melting range of the special solder. The preliminary tube is then curved into the desired shape and is then permanently soldered together in a second or final soldering step using a soldering temperature which is within the melting range of the special solder but lies above the first soldering temperature. Preferably, a non-eutectic solder is used as the special solder in practicing the invention.

The term "non-eutectic solder" as used throughout this specification refers to solder which does not melt at a precisely defined melting point (melting temperature) but over a range which may extend over several degrees of temperature during which melting occurs. Within this melting range, the non-eutectic solder assumes different states of softness such that two bodies may be soldered together even at a temperature which lies in the lower portion of the melting range. The above described property of non-eutectic solder is due to the fact that when soldering at the lower limit of the melting-point range not all the solder is liquefied resulting in a solder joint having a reserve of unused solder. In accordance with the present invention, a second soldering process or step liquefies all the solder including the solder reserve, resulting in a stronger solder connection.

As a result of the two step soldering process of the present invention, straight plates and straight edge strips may be used for the first soldering step, thereby resulting in a surprisingly simple method of manufacture, since the subsequent curving of the flat cross-section tube produced in this manner can be carried out very simply by well known means. Using the present method, a longitudinally curved flat cross-section tube can be manufactured almost as easily as a straight flat cross-section tube consisting of flat plates and straight edge strips.

The invention therefore also makes it possible to conveniently manufacture heat exchangers having at least two curved flat cross-section tubes, as for instance, annular coolers or the like. This can be accomplished by assembling a package consisting of at least two flat cross-section tubes which have been soldered together in a first soldering step and then curved. Sheet metal fins are then arranged between the tubes which fins define straight flow paths perpendicular to the curved direction of flow through the flat cross-section tube. This package is then soldered together by the second soldering step.

BRIEF DESCRIPTION OF THE DRAWINGS

The invention will be described in detail below with reference to an embodiment shown by way of example in the drawing, in which.

DESCRIPTION OF THE PREFERRED EMBODIMENT

Figure 2:
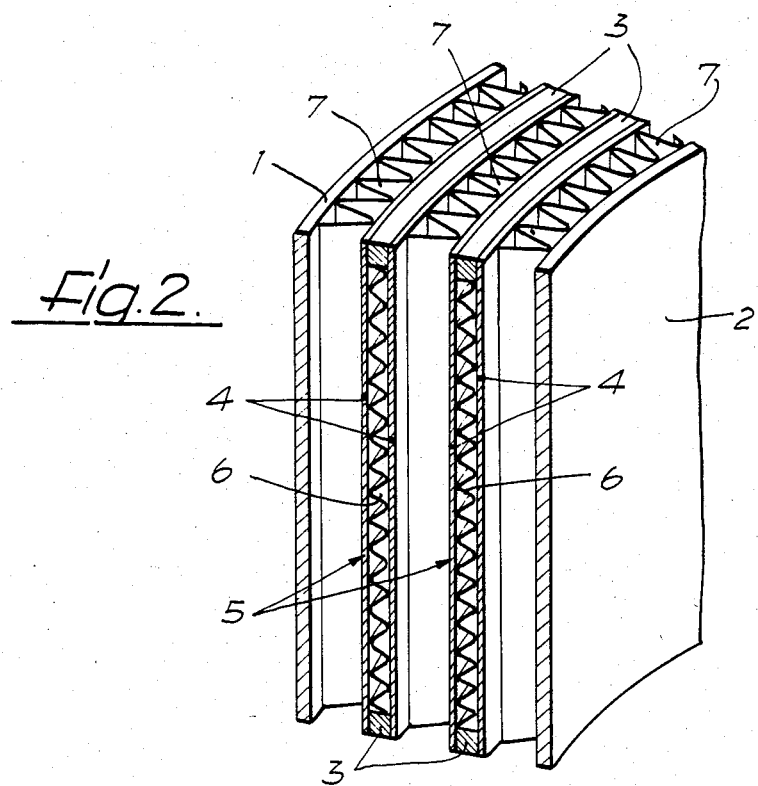
FIG. 2 is an enlarged perspective view in section along the line II—II of FIG. 1.

As can be seen in FIG. 2, the annular cooler comprises an outer wall plate 1, an inner wall plate 2 and two flat cross-section tubes designated as a whole by reference number 6. The tubes 5 are bounded or defined by broad surfaced curved wall elements or sheets 4 that are joined to each other in spaced apart relationship by curved spacing elements or strips 3 arranged between the edges of sheets 4, the space within said flat cross-section tube being divided by sheet metal fins 6 which provide flow channels for the substance to be cooled. Between the two tubes 5 and between the tubes 5 and wall plates 1 and 2 there are provided metal spacer fins 7 which subdivide said spaces into flow channels for the cooling air.

Figure 1:
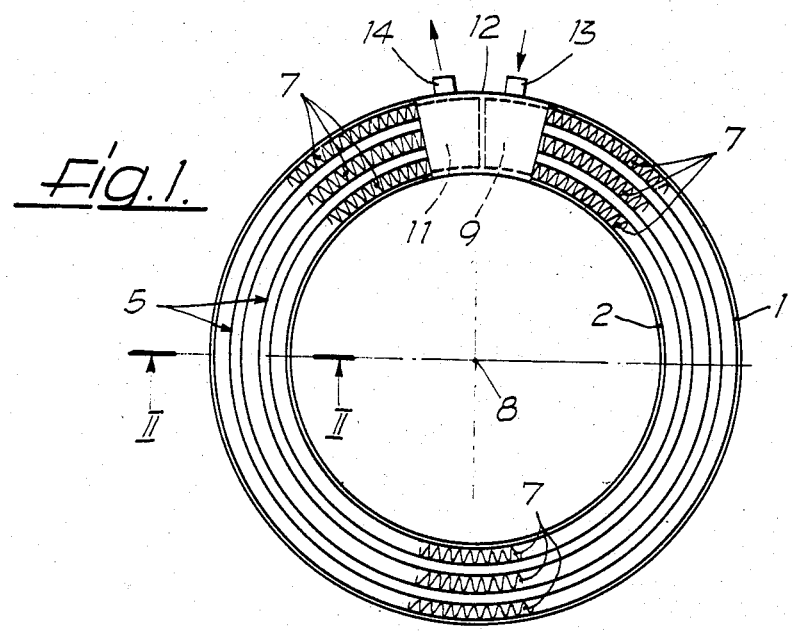
FIG. 1 is a side view of an embodiment developed as an annular cooler.

Wall plates 1 and sheets 4, as shown in FIG. 1, are curved, together with strips 3, annularly around axis 8 which is parallel to plates 1 and 2 and sheets 4, but perpendicular to the direction of flow through tubes 5 which flow is in the circumferential direction as seen in FIG. 1. The ends of the annular package formed in this manner are connected to a box or header 12 which is subdivided into two collector spaces 9 and 11. Each of the two collector spaces is provided with connection nipples 13, 14, respectively; which nipples are used to connect lines for the feeding and discharge, respectively, of, for instance, oil which is to be cooled. As can be seen from the drawings, the direction of flow of the oil to be cooled is along the circumference of the annular cooler while the direction of flow for the cooling air is parallel to axis 8.

For the manufacture of the annular cooler, the tubes 5 are first manufactured by assembling plane or flat sheets or plates 4 with straight strips 3, along with the interposition of sheet metal fins 6, so as to form a planar or flat tube of flat cross-section. All of these parts are clad with a non-eutectic solder. The flat cross-section tube which have been assembled in this manner are then soldered together at the lower limit of the melting range of the non-eutectic solder and then curved into the annular shape shown in FIG. 1. Thereupon the wall plates 1 and 2 are formed by bending flat sheet metal plates, and the sheet metal fins 7 are formed by bending corrugated plates accordingly. Wall plates 1 and 2 are clad with solder; for this purpose, an eutectic solder can also be used. Subsequently, these bent parts are loosely assembled to form the package as shown in FIG. 1. It is held together using suitable clamping means, for instance metal straps (not shown), and heated in a solder bath or a solder oven up to the upper limit of the melting range of the non-eutectic solder, such that all the solder is liquefied and a firm connection between adjacent components is formed upon cooling. Thereupon box 12 is connected by welding to the two ends of the package so that the open ends of the tubes 5 connect to the two collecting spaces 9 and 11.

Although an annular cooler has been described above by way of example, it is evident from what has been stated that the flat cross section tubes may be curved in any desired manner, for instance semi-circularly or even in corrugated fashion.

To enable corrugated fins 6 to be easily curved in the flat cross section tubes, the corrugations are partially subdivided in known manner by cuts extending transverse to the direction of fluid flow so that the cuts can open upon bending the corrugated fins.

What I claim is:

1. A method of manufacturing a heat exchanger having a longitudinally curved tube of flat cross-section defining a curved flow path for a first fluid wherein said tube is defined by two broad surfaced curved wall elements joined to each other in spaced apart relationship by at least two curved spacing elements disposed between and soldered to said wall elements, said method comprising in combination the steps of cladding with a soldering composition at least one of each of the mating surfaces between said wall and spacing element and applying soldering heat thereto, characterized by the steps of selecting for said cladding a special solder having a range over which melting occurs, forming a preliminary tube of flat cross-section by assembling broad surfaced wall elements with spacing elements, at least either said wall elements or said spacing elements being pre-clad with said special solder, and effecting preliminary soldering at a first soldering temperature which lies in the lower part of said melting range, shaping said preliminary tube to form the desired longitudinally curved tube, and thereafter effecting a second soldering of said elements at a second soldering temperature above said first temperature.

2. A method according to claim 1, characterized in that plane plates and straight strips are used, respectively, for said wall elements and said spacing elements during the step of assembling said elements to form said preliminary tube.

3. A method according to claim 1, characterized in that a non-eutectic solder is used as said special solder.

4. A method according to claim 1, characterized by the steps of including sheet metal fins between said broad surfaced wall elements when the latter elements are assembled with said spacing elements to form said preliminary tube, and performing said preliminary soldering with requisite pre-cladding with said special solder to effect preliminary soldering of said fins within said preliminary tube concurrently with preliminary soldering of said tube.

5. A method according to claim 1, characterized by the further steps prior to effecting said second soldering of producing a plurality of said longitudinally curved tubes, assembling said curved tubes with a correspondingly curved corrugated thin metal spacer between successive ones of each of said tubes, the corrugations of said spacer running transverse to the longitudinal direction of said tubes to define straight flow passages for a second fluid between adjacent curves tubes, and thereafter effecting said second soldering with respect to all of said elements and said corrugated spacers.

* * * * *